United States Patent
Acharya et al.

(10) Patent No.: US 6,415,611 B1
(45) Date of Patent: Jul. 9, 2002

(54) CRYOGENIC REFRIGERATION SYSTEM USING MAGNETIC REFRIGERATOR FORECOOLING

(75) Inventors: Arun Acharya, East Amherst; Bayram Arman; Dante Patrick Bonaquist, both of Grand Island, all of NY (US)

(73) Assignee: Praxair Technology, Inc., Danbury, CT (US)

(*) Notice: Subject to any disclaimer, the term of this patent is extended or adjusted under 35 U.S.C. 154(b) by 0 days.

(21) Appl. No.: 09/789,565

(22) Filed: Feb. 22, 2001

(51) Int. Cl.⁷ .............................. F25B 21/00
(52) U.S. Cl. ........................................ 62/3.1
(58) Field of Search ............................ 62/3.1, 6

(56) References Cited

U.S. PATENT DOCUMENTS

| | | | |
|---|---|---|---|
| 4,291,547 A | 9/1981 | Leo | 62/402 |
| 4,953,366 A | 9/1990 | Swift et al. | 62/467 |
| 5,156,003 A | 10/1992 | Yoshiro et al. | 62/3.1 |
| 5,295,355 A | 3/1994 | Zhou et al. | 62/6 |
| 5,412,952 A | 5/1995 | Ohtani et al. | 62/6 |
| 5,435,136 A | 7/1995 | Ishizaki et al. | 60/517 |
| 5,441,658 A | 8/1995 | Boyarsky et al. | 252/67 |
| 5,579,654 A | 12/1996 | Longsworth et al. | 62/511 |
| 5,711,156 A | 1/1998 | Matsui et al. | 62/6 |
| 5,743,095 A * | 4/1998 | Gschneidner, Jr. et al. | 62/3.1 |
| 5,813,234 A | 9/1998 | Wighard | 62/6 |
| 5,887,449 A | 3/1999 | Pecharsky et al. | 62/3.1 |
| 6,050,083 A | 4/2000 | Meckler | 60/39.182 |
| 6,065,305 A | 5/2000 | Arman et al. | 62/613 |
| 6,205,812 B1 * | 3/2001 | Acharya et al. | 62/607 |
| 6,293,106 B1 * | 9/2001 | Acharya et al. | 62/3.1 |

* cited by examiner

Primary Examiner—Denise L. Esquivel
Assistant Examiner—Malik N. Drake
(74) Attorney, Agent, or Firm—Stanley Ktorides

(57) ABSTRACT

A system for providing refrigeration to a heat load, especially over a larger temperature range and at a cryogenic temperature, wherein magnetic refrigeration cools a heat transfer medium to provide higher level refrigeration to a refrigeration fluid, and lower level refrigeration is provided to the fluid using a nonmagnetic system.

3 Claims, 3 Drawing Sheets

CRYOGENIC REFRIGERATION SYSTEM USING MAGNETIC REFRIGERATOR FORECOOLING

TECHNICAL FIELD

This invention relates generally to the generation and provision of refrigeration, and is particularly useful for providing refrigeration over a large temperature range and to very low temperatures.

BACKGROUND ART

Refrigeration is typically provided to a heat load by generating refrigeration and providing the refrigeration to a recirculating refrigeration fluid passing between the refrigeration generator and the heat load. This system works well when the heat load is to be cooled to a temperature not appreciably below atmospheric, such as an air conditioning system or a food freezing system. However, when it is desired to cool the heat load to a much colder temperature, such as to a cryogenic temperature at or below 200K, conventional refrigeration systems are inefficient and costly to operate.

Accordingly, it is an object of this invention to provide a refrigeration system which can efficiently provide refrigeration to a heat load especially at a cryogenic temperature.

SUMMARY OF THE INVENTION

The above and other objects, which will become apparent to those skilled in the art upon a reading of this disclosure, are attained by the present invention, which comprises in general the generation of refrigeration at a relatively higher level using a magnetic refrigeration system, and the generation of lower level refrigeration using a system other than a magnetic refrigeration system, to produce first a cooled refrigeration fluid at a temperature within the range of from 30 to 290K, preferably from 50 to 120K, and then a cold refrigeration fluid at a temperature within the range of from 2 to 270K, preferably from 4 to 100 k, which is used to provide the refrigeration to the heat load. More specifically, one aspect of the two step refrigeration system of this invention is:

A method for providing refrigeration to a heat load comprising:

(A) magnetizing a bed of magnetizable material, demagnetizing the magnetized bed material, cooling working fluid by bringing the working fluid into contact with the demagnetized bed material, and cooling heat transfer medium by indirect heat exchange with the cooled working fluid;

(B) warming the cooled heat transfer medium by indirect heat exchange with refrigeration fluid to produce cooled refrigeration fluid at a first temperature within the range of from 30 to 290K;

(C) providing refrigeration into the cooled refrigeration fluid to produce cold refrigeration fluid at a second temperature lower than said first temperature and within the range of from 2 to 270;

(D) warming the cold refrigeration fluid by passing refrigeration from the cold refrigeration fluid into a heat load.

Another aspect of the invention is:

Apparatus for providing refrigeration to a heat load comprising:

(A) a magnetic refrigerator having a bed of magnetizable material, means for magnetizing and demagnetizing the bed of magnetizable material, and containing working fluid for contact with the bed of magnetizable material;

(B) a heat transfer medium circuit comprising a heat transfer medium heat exchanger, means for passing heat transfer medium from the magnetic refrigerator to the heat transfer medium heat exchanger, and means for passing heat transfer medium from the heat transfer medium heat exchange to the magnetic refrigerator;

(C) means for passing refrigeration fluid to the heat transfer medium heat exchanger, and means for providing refrigeration into the refrigeration fluid downstream of the heat transfer medium heat exchanger; and (D) a heat load and means for passing refrigeration from the refrigeration fluid into the heat load.

As used herein, the term "indirect heat exchange" means the bringing of fluids into heat exchange relation without any physical contact or intermixing of the fluids with each other.

As used herein, the term "direct heat exchange" means the transfer of refrigeration through contact of cooling and heating entities.

As used herein, the term "magnetize" means to induce magnetic properties to a substance by use of an externally applied electrical field.

As used herein, the term "heat load" means an entity at a higher temperature capable of receiving refrigeration and thus being cooled to a lower temperature.

DETAILED DESCRIPTION

Figure 1:
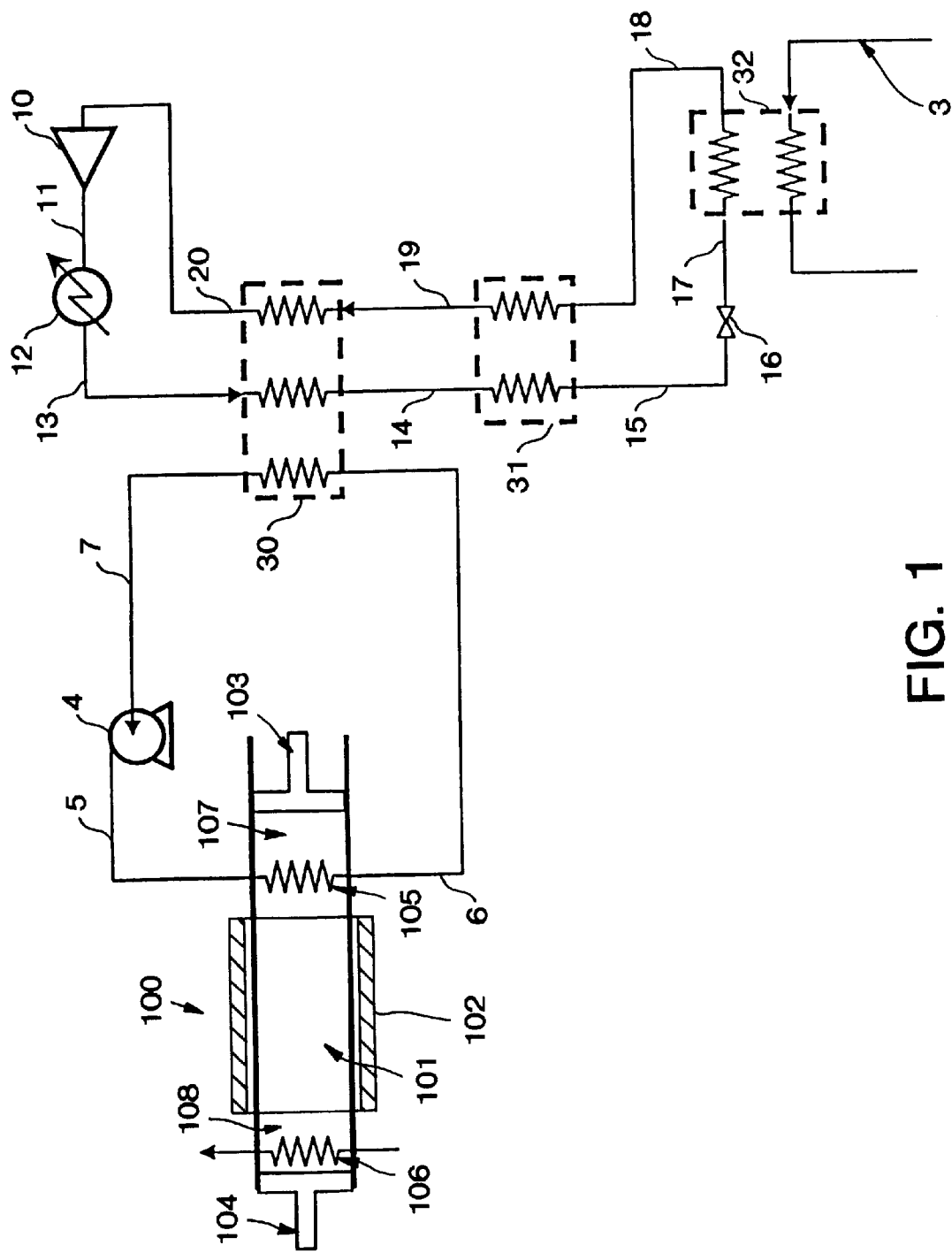
FIG. 1 is a schematic representation of one preferred embodiment of the invention wherein lower level refrigeration is provided to the cooled refrigeration fluid by operation of a multiple component refrigerant compression/expansion cycle.

The invention will be described in detail with reference to the Drawings. Referring now to FIG. 1, magnetic refrigerator 100 comprises magnetizable material bed 101, moveable strong electromagnet or superconducting magnet 102, pistons 103 and 104, a cold heat exchanger 105 and a hot heat exchanger 106. Examples of magnetizable material which can be used in the practice of this invention include $GdNi_2$, $GdZn_2$, $GdTiO_3$, $Gd_2Ni_{17}$, $GdAl_2$, $GdMg$, $GdCd$, $Gd_4Co_3$, $GdGa$, $Gd_5Si_4$, and $GdZn$. The void space surrounding the magnetic bed articles in bed 101 and the volumes in piston cylinders 107 and 108 are filled with working fluid, examples of which include helium, neon, nitrogen, argon, methane, carbontetrafluoride fluorocarbons, hydrofluorocarbons, fluoroethers, hydrofluoroethers, and mixtures thereof.

At the beginning of the cycle cold heat exchanger 105 is initially at a low temperature and hot heat exchanger 106 is at a warmer temperature. Magnet 102 is used to magnetize bed 101. The magnetocaloric effect causes each magnetic particle in bed 101 to warm slightly. Pistons 103 and 104 are moved to their extreme left position causing the enclosed working fluid, e.g. helium gas, to flow from the right cylinder 107, through cold heat exchanger 105, magnetic refrigerator bed 101 and hot heat exchanger 106 to fill the volume in cylinder 108. The particles in bed 101 are cooled by the flowing gas, and the gas in turn is warmed. Heat from the gas is transferred to cooling water as the gas flows through hot heat exchanger 106. When the pistons have reached their extreme left position the gas flow is stopped and the magnetic field is removed, cooling bed 101 by the magnetocaloric effect. Pistons 103 and 104 are moved back to their extreme right positions causing the helium gas to flow from cylinder 108, through hot heat exchanger 106, magnetic refrigerator bed 101 and cold heat exchanger 105 into cylinder volume 107. The helium gas is cooled by direct heat exchange as it passes through bed 101, and is warmed in cold heat exchanger 105 as it cools by indirect heat exchange the heat transfer medium passing therethrough as part of a heat transfer medium circuit which also includes pump 4 and heat transfer medium heat exchanger 30.

Heat transfer medium from heat transfer medium heat exchanger 30 is passed in line 7 to pump 4 and from there in line 5 to cold heat exchanger 105 wherein it is cooled by indirect heat exchange with the cooled working fluid as was previously described. Resulting cooled heat transfer medium is passed from cold heat exchanger 105 in line 6 to heat transfer medium heat exchanger 30 wherein it is warmed serving to cool by indirect heat exchange refrigeration fluid passed to heat exchanger 30 in line 13. The warmed heat transfer medium is withdrawn from heat exchanger 30 in line 7 and recirculated back to the magnetic refrigerator as was previously described. Examples of fluids for use as the heat transfer medium from the magnetic refrigerator to the heat exchanger 30 include helium, hydrogen, neon, atmospheric gases such as nitrogen, argon and carbon monoxide, hydrocarbons such as methane and ethylene, fluorocarbons and hydrofluorocarbons such as carbon tetrafluoride, fluoroethers, and hydrofluoroethers such as methoxytrifluoromethylether.

In the embodiment of the invention illustrated in FIG. 1 the system used to provide lower level refrigeration to the refrigeration fluid is a multiple component refrigeration system wherein a multiple component refrigeration fluid recirculating in a circuit undergoes compression and expansion steps and delivers refrigeration to a heat load. In this embodiment the multicomponent refrigeration fluid preferably comprises at least one atmospheric gas preferably nitrogen, argon and/or neon, and preferably at least one fluorine containing compound having up to six carbon atoms such as fluorocarbons, hydrofluorocarbons, hydrochlorofluorocarbons, fluoroethers and hydrofluoroethers, and/or at least one hydrocarbon having up to five carbon atoms.

Referring back now to FIG. 1, compressed refrigeration fluid 13, which in this embodiment is a multicomponent refrigeration fluid, is cooled to a first temperature within the range of from 110 to 280K by passage through heat transfer medium heat exchanger 30 by indirect heat exchange with the aforediscussed warming heat transfer medium. Resulting cooled refrigeration fluid 14 is further cooled by passage through heat exchanger 31 and resulting refrigeration fluid stream 15 undergoes expansion through an expansion device, such as Joule-Thomson valve 16, to generate refrigeration. The refrigeration provided to the refrigeration fluid by the expansion through valve 16 results in the establishment of cold refrigeration fluid 17 at a second temperature, which is lower than the first temperature, and is within the range of from 3 to 240K. The cold refrigeration fluid 17 is passed to heat exchanger 32 wherein it is warmed thereby passing refrigeration from the cold refrigeration fluid to heat load 3. Examples of the uses of the refrigeration provided to the heat load include propellant densification, product recondensation, gas separation, freeze drying and crystallization, pharmaceutical processing, food freezing, and industrial gas liquefaction.

The resulting warmed refrigeration fluid 18 is further warmed by passage through heat exchanger 31 and then resulting stream 19 is still further warmed by passage through heat exchanger 30 wherein it assists in the cooling of the refrigeration fluid down to the first temperature. Resulting refrigeration fluid 20 from heat exchanger 30 is compressed to a pressure generally within the range of from 60 to 2000 pounds per square inch absolute (psia) in compressor 10. Compressed refrigeration fluid 11 is cooled of the heat of compression by passage through cooler 12 and resulting compressed refrigeration fluid 13 is passed to heat exchanger 30 and the refrigeration cycle repeats.

Figure 2:
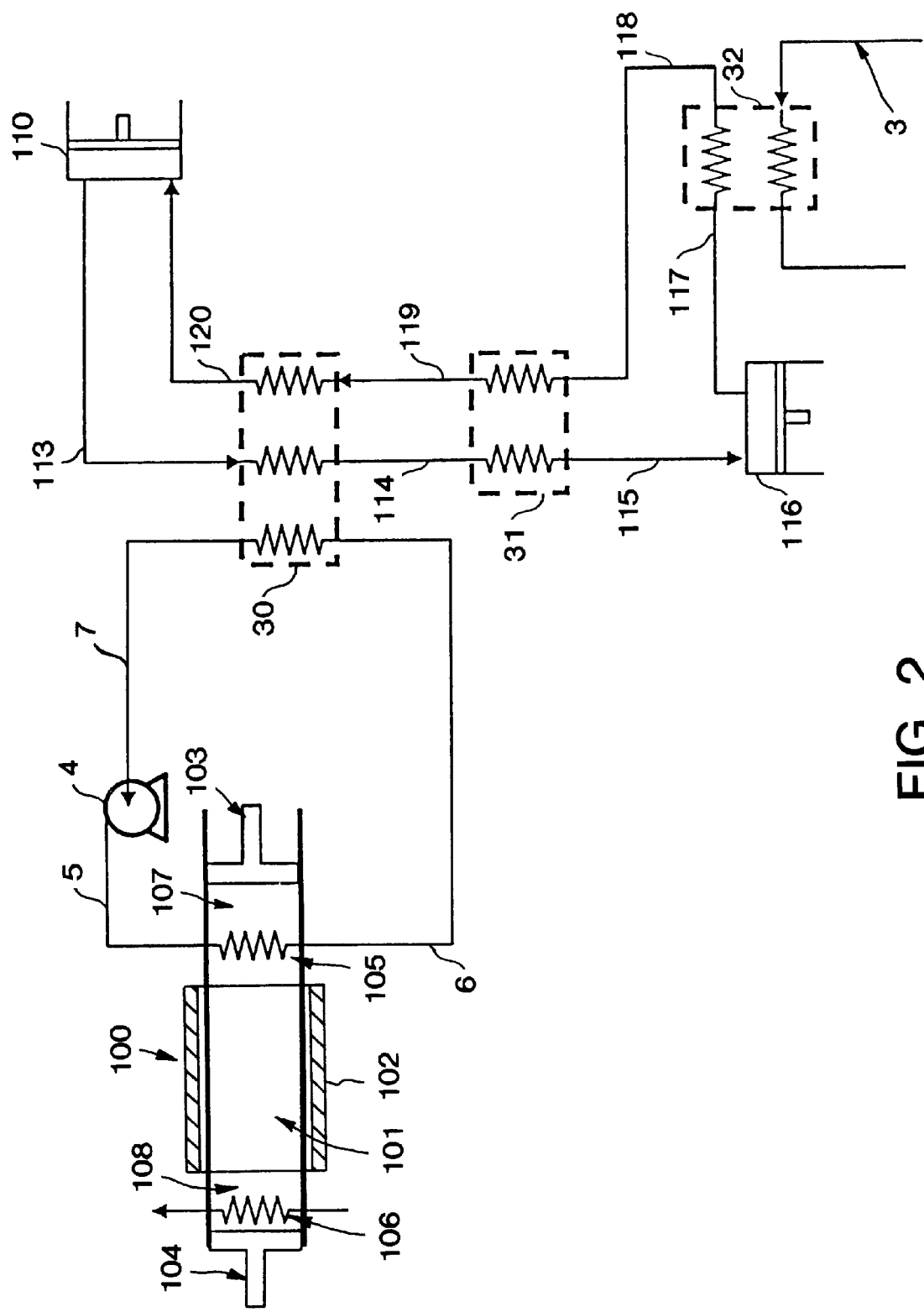
FIG. 2 is a schematic representation of another preferred embodiment of the invention wherein lower level refrigeration is provided to the cooled refrigeration fluid by operation of a Brayton refrigerator.
Figure 3:
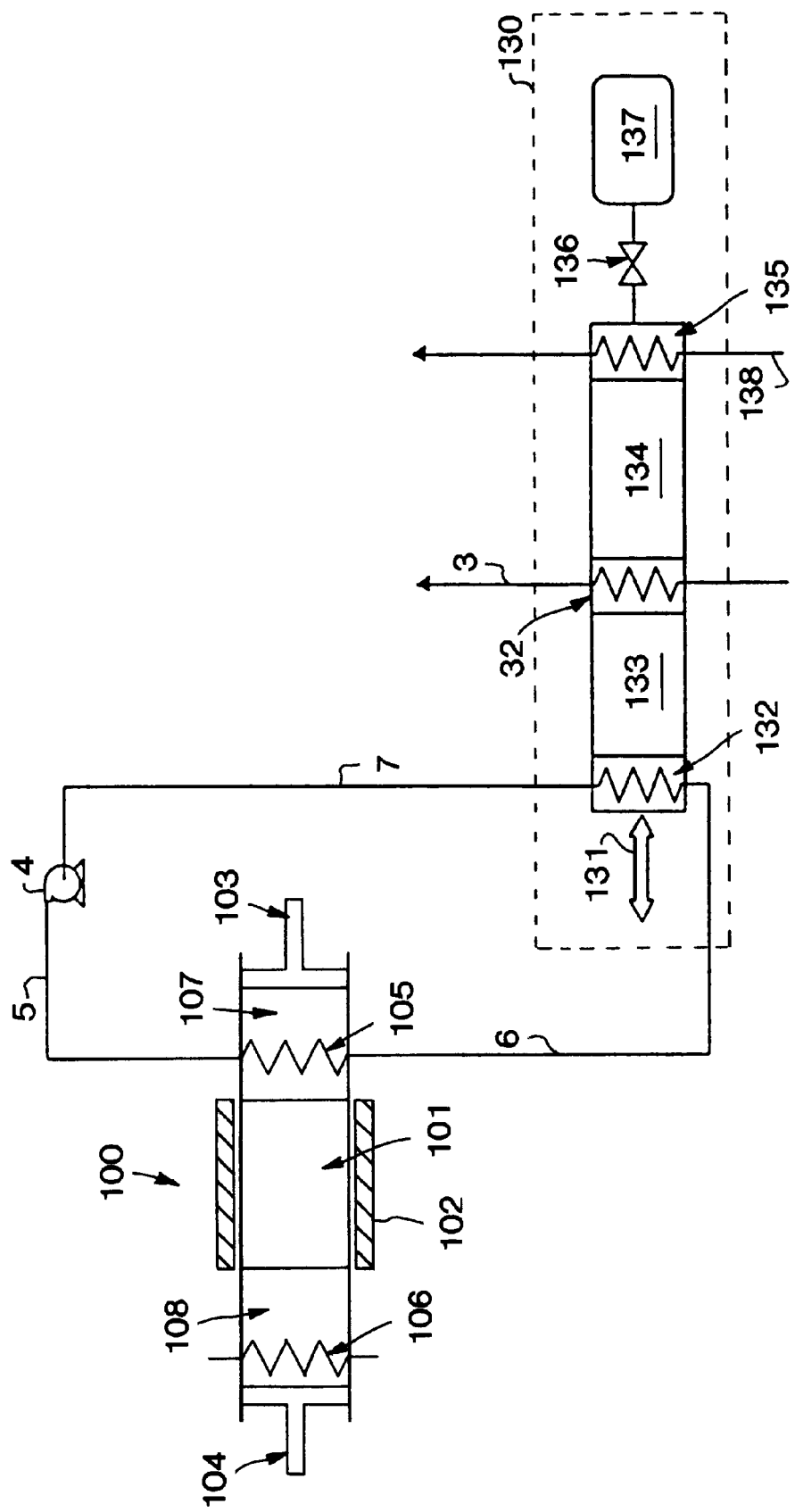
FIG. 3 is a schematic representation of another preferred embodiment of the invention wherein lower level refrigeration is provided to the cooled refrigeration fluid by operation of a pulse tube refrigerator.

FIGS. 2 and 3 illustrate other preferred embodiments of the invention. The numerals in FIGS. 2 and 3 are the same as those of FIG. 1 for the common elements and these common elements will not be discussed again in detail. FIG. 2 illustrates an embodiment wherein lower level refrigeration is provided to the refrigeration fluid using a Brayton refrigerator and FIG. 3 illustrates an embodiment wherein lower level refrigeration is provided to the refrigeration fluid using a pulse tube refrigerator.

Referring now to FIG. 2, Brayton system working fluid is compressed in compressor 110 and heat of compression is removed (not shown). The compressed stream 113 is forecooled to an intermediate temperature, generally within the range of from 110 to 280K, in heat transfer medium heat exchanger 30 against the heat transfer medium 6–7, and returning Brayton system working fluid stream 119–120. The forecooled refrigeration fluid stream 114 continues to be cooled in heat exchanger 31, exiting as colder stream 115. This stream is then expanded by expansion engine (or turboexpander) 116 thereby generating the low temperature refrigeration required in the process. The cold expander effluent stream 117, at a temperature generally within the range of from 3 to 240K, is then passed to load heat exchanger 32. Here the load 3 is transferred to the circulating refrigerant stream 117–118. Effluent stream 118 is then warmed to an intermediate temperature in heat exchanger 31 before being transferred to forecooling heat exchanger 30. Forecooling heat exchanger 30 warms the refrigerant back to ambient temperature and the cycle is repeated.

Referring now to FIG. 3, the magnetic refrigerator system supplies forecooling to pulse tube refrigeration system 130. Regenerator 133 contains pulse tube gas which may be hydrogen, neon, nitrogen, a mixture of helium and neon, a mixture of neon and nitrogen, or a mixture of helium and hydrogen. Mixtures of helium and hydrogen are preferred. A pulse, i.e. a compressive force, is applied to the hot end of regenerator section 133 as illustrated in representational form by pulse arrow 131 thereby initiating the first part of the pulse tube sequence. Preferably the pulse is provided by a piston which compresses a reservoir of pulse tube gas in flow communication with regenerator section 133. Another preferred means of applying the pulse to the regenerator is by the use of a thermoacoustic driver which applies sound energy to the gas within the regenerator. Yet another way for applying the pulse is by means of a linear motor/compressor arrangement. Yet another means to apply pulse is by means of a loudspeaker. Another preferred means to apply pulse is by means of a travelling wave engine. The pulse serves to compress the pulse tube gas producing hot pulse tube gas at the hot end of the regenerator. The hot pulse tube gas is cooled by indirect heat exchange with heat transfer medium 6 in heat transfer medium heat exchanger 132 to produce warmed heat transfer medium in stream 7 and to produce cooled compressed pulse tube gas, at a temperature generally within the range of from 110 to 280K, for passage through the remainder of the regenerator, i.e. the regenerator body. The regenerator body contains regenerator media. Examples of suitable regenerator media in the practice of this invention include steel balls, wire mesh, high density honeycomb structures, expanded metals, lead balls, copper and its alloys, complexes of rare earth element(s) and transition metals.

The regenerator media is at a cold temperature, generally within the range of from 3 to 200K at the cold end to 20 to 280K at the warm end, having been brought to this cold temperature in the second part of the pulse tube sequence which will be described more fully below. As the cooled compressed pulse tube gas passes through the regenerator body, it is further cooled by direct contact with the cold regenerator media to produce warmed regenerator media and cold pulse tube gas, generally at a temperature within the range of from 4 to 201K at the cold end to 21 to 281K at the warm end.

The cold pulse tube gas is passed from the regenerator to pulse tube 134 at the cold end. As the cold pulse tube gas passes into pulse tube 134 at the cold end, it generates a gas pressure wave which flows toward the warm end of pulse tube 134 and compresses the gas within the pulse tube, termed the pulse tube working fluid, thereby heating the pulse tube working fluid.

Cooling fluid 138 is passed to pulse tube heat exchanger 135 wherein it is warmed or vaporized by indirect heat exchange with the pulse tube working fluid, thus serving as a heat sink to cool the pulse tube working fluid. Resulting warmed or vaporized cooling fluid is withdrawn from pulse tube heat exchanger 135. Preferably cooling fluid 138 is water. Other cooling fluids which may be used in the practice of this invention include ethylene glycol, water/glycol mixtures, and air.

Attached to the warm end of pulse tube 134 is a line having orifice 136 leading to reservoir 137. The compression wave of the pulse tube working fluid contacts the warm end wall of the pulse tube and proceeds back in the second part of the pulse tube sequence. Orifice 136 and reservoir 137 are employed to maintain the pressure and flow waves in phase so that the pulse tube generates net refrigeration during the expansion and the compression cycles in the cold end of pulse tube 134. Other means for maintaining the pressure and flows waves in phase which may be used in the practice of this invention include inertance tube and orifice, expander, linear alternator and bellows arrangements. In the expansion sequence, the pulse tube gas expands to produce ultra cold pulse tube gas at the cold end of the pulse tube 134. The expanded gas reverses its direction such that it flows from the pulse tube toward regenerator 133. The ultra cold pulse tube gas or refrigeration fluid provides refrigeration to heat load stream 3 in heat exchanger 32. The pulse tube gas emerging from heat exchanger 32 is passed to regenerator 133 wherein it directly contacts the regenerator media within the regenerator body to produce the aforesaid cold regenerator media, thereby completing the second part of the pulse tube refrigerant sequence and putting the regenerator into condition for the first part of a subsequent pulse tube refrigeration sequence.

Although the invention has been described in detail with reference to certain preferred embodiments, those skilled in the art will recognize that there are other embodiments of the invention within the spirit and the scope of the claims.

What is claimed is:

1. A method for providing refrigeration to a heat load comprising:

(A) magnetizing a bed of magnetizable material, demagnetizing the magnetized bed material, cooling working fluid by bringing the working fluid into contact with the demagnetized bed material, and cooling heat transfer medium by indirect heat exchange with the cooled working fluid;

(B) warming the cooled heat transfer medium by indirect heat exchange with refrigeration fluid to produce cooled refrigeration fluid at a first temperature within the range of from 50 to 120 K;

(C) providing refrigeration into the cooled refrigeration fluid to produce cold refrigeration fluid at a second temperature lower than said first temperature and within the range of from 4 to 100 K;

(D) warming the cold refrigeration fluid by passing refrigeration from the cold refrigeration fluid into a heat load.

2. The method of claim 1 wherein the refrigeration fluid is a multicomponent refrigeration fluid.

3. The method of claim 1 wherein the refrigeration fluid is pulse tube gas.

\* \* \* \* \*